3,562,153
OIL ABSORBENT COMPOSITIONS
Paul R. Tully, Lowell, Robert J. Lippe, Methuen, and William J. Fletcher, Saugus, Mass., assignors to Cabot Corporation, Boston, Mass., a corporation of Delaware
No Drawing. Filed Feb. 5, 1970, Ser. No. 9,058
Int. Cl. E02b 15/04
U.S. Cl. 210—36
19 Claims

ABSTRACT OF THE DISCLOSURE

A composition and process is provided for the removal of oily contaminants from water systems. Absorbent materials are treated with certain hydrophobic colloidal solids. The treated material is then contacted with the contaminated water and preferentially absorbs the oil therefrom.

THE PRIOR ART

In U.S. 3,464,920, Pirson et al., Sept. 2, 1969, there is disclosed a method for the removal of oil contaminants from water bodies which broadly comprises the application of a comminuted organic material which has been treated with an organosilane compound so as to render said material hydrophobic. Additionally, the treated organic materials are further described as absorbing the oil contaminants preferentially from the water surface.

Hans Pape, in U.S. 3,382,170, issued May 7, 1968, discloses an absorbent mineral material, perlite, which is treated with a silicone polymer fluid or emulsion. The silicone treated perlite is described as being selectively absorbtive of oil as well as maintaining its oil absorption efficiency despite prolonged periods of immersion in water.

While the processes outlined above and the absorbent materials resulting therefrom are highly meritorious, we have discovered that absorbent materials may be treated in such a manner as to even better befit them for the purpose of scavenging oil contaminants from water.

OBJECTS OF THE INVENTION

It is a principal object of the invention to provide novel absorbent materials.

It is another object of the invention to provide a novel process for decontaminating oil polluted water.

It is another object of the invention to provide materials having selective oil absorption properties.

It is yet another object of the invention to provide absorbent materials having improved rates of oil absorption when contacted with oil contaminated water.

Other objects and advantages of the invention will in part be obvious and will in part appear hereinafter.

GENERAL DESCRIPTION OF THE INVENTION

In accordance with the present invention we have discovered that improved oil absorbent materials are provided when a liquid absorbing material is treated with certain colloidal hydrophobic metal or metalloid oxides. When contacted with oil contaminated water, the improved absorbents of the invention display superior qualities of bouyancy, water repellency and oil receptivity.

DETAILED DESCRIPTION OF THE INVENTION

Absorbent materials suitable for treatment by the process of the invention are generally any inorganic or organic solid capable of imbibing liquids. Often, the starting absorbent material will be particulate, granular or fibrous in nature, and in the interests of facile handling and treatment, such materials will desirably be at least 50 microns in their smallest average dimension. Accordingly, crushed charcoal or coke, sand, kieselguhr, diatomaceous earth, peat, textile fibers, sawdust, chalk, mica, expanded mica, cork, felt, straw, wood chips, paper, nut shells, granulated corn cobs and the like are all normally useful starting materials. Due to their generally close location with respect to water environments, diatomaceous earth, sand and dry marsh vegetation such as salt hay are normally advantageously employed.

The colloidal oxides useful in the practice of the invention can generally be any metal or metalloid oxide having an average ultimate particle diameter of less than about 0.5 micron (preferably less than about 0.1 micron) and a BET-$N_2$ surface area of at least 50 m.$^2$/gram (preferably greater than about 100 m.$^2$/gram). In order that the particulate metal or metalloid oxide be rendered substantially permanently hydrophobic by a chemisorption reaction thereof with the organosilicon compound it is of further importance that said starting oxide material bear on the surface thereof at least about 0.25 milliequivalent per gram and preferably above about 1.0 milliequivalent per gram of hydroxyl groups. Specific examples of suitable available starting material oxides are: pyrogenic and precipitated silicas, titania, alumina, zirconia, vanadia, chromia, iron oxide, silica/alumina, etc.

Additionally, it is desirable that the oxide be relatively non-porous, i.e. that the preponderance of the total surface area thereof be external rather than internal (pore volume). The relative porosity of a given colloidal particulate solid can be determined by (1) calculating the surface area thereof predicated upon the average particle diameter (such as visually determined by electron micrographic analysis) and assuming no porosity; (2) experimentally determining the actual total surface area by the well known BET-$N_2$ adsorption method. Accordingly, the porosity of the particulate solid is expressed as follows:

$$\text{Percent porosity} \frac{\text{BET-}N_2 \text{ S.A.} - \text{E.M. S.A.}}{\text{BET-}N_2 \text{ S.A.}} \times 100$$

For the purpose of the present invention, those particulate colloidal metal or metalloid oxides having a porosity of less than about 10% are to be considered relatively non-porous. Due principally to the above porosity consideration as well as their normally relatively high hydroxyl group populations surface areas and general availability, pyrogenic and precipitated silicas are starting materials of choice.

Pyrogenic silicas are generally defined as those silicas produced by the oxidation and/or hydrolysis at high temperature (above about 800° C.) of a silicon compound such as silicon tetrachloride, silicon disulfide and the like. Further details of pyrogenic silica producing processes can be had by reference to U.S. Pats. Nos. 2,428,178; 2,990,249; 3,043,062; 3,203,759; 3,416,980; 3,130,008; 3,086,841; and 3,024,089.

The preciptated silicas are produced by the acidulation or neutralization of an aqueous alkali metal silicate solution. Said acidulation or neutralization results in precipitation of a silica hydrosol from solution which is then aged to a gel or semi-gel state, washed free of alkali metal salts, dried and ground to a colloidal impalpable powder. Further details relating to various permutations of the generalized precipitated silica process outlined above can be had by reference to U.S. Pats. 2,865,777; 2,900,348; 2,913,419; 2,995,422; 3,010,791; 3,034,913; 3,172,726; 3,250,594.

The art of treatment by reaction of metal oxides and metalloid oxides, particularly colloidal silicas, with various organosilicon compounds has been rather extensively developed. Accordingly, suffice it to say, that various organosilicon compounds bearing one or two functional moieties/molecule can be reacted through said functional moieties with hydroxyl groups existing on the surface of metal oxides or metalloid oxides. The resulting reaction product is characterized as a metal oxide or metalloid oxide having chemically bonded to the surfaces thereof organosilicon structure or groups represented generally by the formula:

$$\{O:\!-\!Si\,R_aX_b$$

wherein } represents the oxide surface; O is oxygen; : represents the interface of the original oxide surface with the organosilicon surface groups; Si is silicon; each R is any alkyl, aryl, alkaryl, alkoxy, aryloxy, alkaryloxy or aralkoxy group; $a$ is an integer of from 2 to 3; each X is a halogen or hydroxyl group, $b$ is an integer from 0 through 1; and $a+b$ 3. In the practice of the present invention it is preferred that $a$ in the above formula be 3.

Specific examples of organosilicon compounds which can be reacted with the colloidal oxides useful in the invention are: organohalosilanes such as $(CH_3)_3SiCl$, $(CH_3)_2SiBr_2$, $(CH_3)_2SiCl_2$, $(C_4H_9)_3SiCl$; organosilylamines such as $(CH_3O)_3Si(CH_2)_3NH(CH_2)_2NH_2$, $(CH_3O)_2(CH_3)SiCH_2CH(CH_3)CH_2NHCH_2CH_2NH_2$;

organodisilazanes such as $(CH_3)_3SiNHSi(CH_3)_3$ and $(C_4H_9)_3SiNHSi(C_4H_9)_3$, etc. Further details concerning various specific processes for reacting colloidal metal and metalloid oxides with organosilicon compounds can be had by reference to the following U.S. patent literature: 2,510,661; 2,589,705; 2,705,206; 2,705,222 and 3,023,181.

In any case, it is important that the organosilicon compound treatment of the colloidal oxide provide a product bearing at least about 0.5% by weight of the oxide of the above-defined organosilicon surface structures chemically bonded to the oxide surface. Preferably, said organosilicon surface structures form at least about 2% by weight of the metal or metalloid oxide.

The amount of hydrophobic colloidal oxide required to treat the particulate absorbent material can vary widely depending upon such parameters as the particular material to be treated, the particle size and organosilicon group concentration on the surface of the treating oxide, the desired extent in change of properties of the absorbent material, the relative densities of the absorbent material and the colloidal hydrophobic oxide, etc. Generally speaking, however, it will be found that sufficient colloidal hydrophobic oxide should be employed as to result in an absorbent material having a coating thereon of said colloidal oxide representing at least about 0.1% by weight of the untreated material. Preferably, the treated absorbent will bear thereon between about 0.25 and about 2% by weight of the untreated material of the hydrophobic colloidal oxide.

The manner in which the absorbent material is treated with the colloidal oxide is normally not critical. Accordingly, said oxide may be deposited upon the absorbent by application of a dispersion thereof in an inert volatile solvent. Subsequent to the application step the volatile solvent is removed prior to use such as by air drying, heating, etc. Ordinarily, however, said hydrophobic colloidal oxide treatment of the absorbent material may be readily accomplished by simply contacting the absorbent material and the hydrophobic oxide in the dry state and agitating the resulting mixture sufficiently to ensure at least relatively uniform deposition of said absorbent material. This latter outlined method is both simple and well adapted for on-site practice of the invention when oil spills are to be removed from bodies of water.

The contacting of the hydrophobic oxide treated absorbents of the instant invention with the oil contaminated water may be achieved in any suitable manner. For instance, the treated absorbent may be applied directly to a contaminated water body. Also, the treated absorbents of the invention, due largely to their unusual ability to withstand prolonged periods of exposure to water without imbibing substantial quantities thereof, may also be applied to water bodies prior to contamination thereof with oil. In this manner, the absorbent material is retained in the water system and, upon subsequent oil contamination of the water, then scavenges the oil contaminant from the water phase. In yet another manner of use of the hydrophobic oxide treated absorbents, the absorbent may be packed into a container or column and the oil contaminated water conducted therethrough. Broadly speaking, therefore, this latter contemplated manner of employment of the absorbents of the invention resides in their use as filter element media.

Upon exhaustion of the absorbent material or completion of the absorption step said material may be mechanically removed from the water body and the oil imbedded therein recovered, burned or disposed of in any other suitable manner. Alternatively, in instances wherein the absorbed oil remains on the water surface, said oil may be combusted. When the colloidal oxide treated absorbent material is of substantially greater density than water, there will be a tendency for the oil loaded absorbent to sink beneath the water surface. Often, said sinking alone will constitute the desired effect of the use thereof.

There follow a number of illustrative non-limiting examples:

EXAMPLE 1

Two absorbent systems are produced based upon chopped dry straw and dry beach sand ($-12+20$ Tyler mesh) absorbents respectively. In each instance, the absorbent material is divided into four substantially equal lots, one each of said lots are retained as controls. The remaining lots of each class of absorbent are separately treated in the following manner:

Treatment 1.—The sample lot is agitated and wetted with a dimethylsiloxane polymer emulsion comprising about 100 ccs. of the siloxane polymer per liter of water and about 1% by weight of the total emulsion of nonylphenylether of ethylene glycol stabilizer. Sufficient emulsion is employed so as to result in a treated absorbent having a coating thereon comprising about 0.25% of siloxane polymer by weight of the untreated absorbent material. Subsequent to wetting of the absorbent with the siloxane emulsion, the system is dried substantially completely by flowing air, heated to about 150° F., over the treated absorbent material.

Treatment 2.—The sample lot is treated by contacting the absorbent material with about 0.25% by weight of dimethyldichlorosilane, $(CH_3)_2SiCl_2$. The treated lot is then maintained in a sealed container at room temperature for about 24 hours prior to use thereof.

Treatment 3.—The sample lot is treated by agitating the absorbent material with about 0.25% by weight thereof of a hydrophobic colloidal silica having chemically bonded to the surfaces thereof about 4 weight percent of organosilicon structures conforming to the formula:

$$\begin{array}{c} CH_3 \\ | \\ -Si-OH \\ | \\ CH_3 \end{array}$$

Said hydrophobic silica is produced by contacting a pyrogenic colloidal silica having an average ultimate particle diameter of about 15 millimicrons, a BET-$N_2$ surface area of about 150 m.²/gram, a porosity of less than about 2% and a surface hydroxyl group concentration of about 1.5 milliequivalents per gram with dimethyldichlorosilane, $(CH_3)_2SiCl_2$, at room temperature. The thusly contacted silica is then placed in a sealed container and maintained therein at ambient temperature for about 24 hours. The contents of the container is then sparged with steam for about 15 minutes prior to use thereof.

The treated absorbents are then subjected to the following test procedures:

Wetting time.—25 gram samples of the control and treated lots are sprinkled into separate 1000 cc. beakers previously filled with tap water. The contents of the beakers are then maintained in a quiescent state and are examined at hourly intervals. Wetting of the sand is signalled by sinking thereof to the bottom of the beaker while wetting of the straw is displayed by sinking of the straw to beneath the surface of the water. Wetting time in the table following is defined as the number of hours to result in 50% wetting of each of the absorbent lots.

Oil uptake.—1000 grams of water and 50 grams of No. 5 fuel oil are charged into each of twelve 1500 cc beakers. Next, the liquid contents of the beaker are agitated sufficiently to disperse the oil into the water. Under these agitation conditions treated absorbent samples are charged in 5 gram increments into their respective oil/water systems. After each charge of absorbent agitation is continued for one minute followed by one minute of rest. Oil uptake is considered as complete when, upon the resting step, substantially no dispersed oil is seen to remain in the water phase. In the accompanying table, the resulting oil uptake data is presented in terms of grams oil absorbed/100 gms. absorbent.

Additionally, two series of oil uptake tests are undertaken. In the first series, the results of which are denoted in the table under the "Dry" column, the sample absorbents are employed in the dry virgin state. In the second series, however, denoted under the "Prewetted" column the absorbent samples employed are first bagged in weighted nylon mesh bags and charged into a pail containing tap water for a period of about 24 hours. The thusly wetted bagged samples are hung in the atmosphere for 2 hours in order to drain excess water therefrom and the contents thereof are then employed without further treatment in the oil uptake test described hereinbefore. As will be evident, the less the oil uptake disparity resulting between the "Dry" and the "Prewetted" samples of equivalently treated samples, the greater is the preservation of the preferential oil absorption efficiency of the absorbent material due to the particular treatment applied thereto. Accordingly, the "Retained Efficiency" column appearing in the table is directly expressed by the following function:

$$\text{Percent Retained Efficiency} \frac{\text{Oil Uptake—Prewetted}}{\text{Oil Uptake—Dry}} \times 100$$

1.3 milliequivalents per gram. Said silica had additionally been treated with about 2.5 weight percent thereof of hexamethyldisilazane, $(CH_3)_3SiNHSi(CH_3)_3$. Carbon and infrared analyses of the treated colloidal silica product reveals that said silica has chemically bonded to the surface thereof about 2 weight percent of surface structures conforming to the formula:

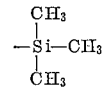

Next, the two cans are disposed vertically in ring stands and the inlet means thereof are connected to a Y fitting, thus forming a common inlet into the cans. An oil/water dispersion is formed by violent and continuous agitation of about 5 gallons of water and 1 qt. of S.A.E. 20 automotive lubricant oil. The resulting dispersion is charged into the Y fitting at a rate of about ½ pt. per minute. The resulting efflux from the respective cans is collected in separate glass jars and it is noted that after minutes significant quantities of oil form part of the efflux from the can containing the untreated sand. Upon completion of the filtration the efflux filtrate from the can containing the hydrophobic oxide treated sand is found to be substantially completely oil-free.

While there is no intent to be bound by this explanation it is thought that the unexpected improved properties of the absorbents of the present invention over similar absorbents treated in accordance with the hereinbefore cited prior art processes are due, in large measure, to the relatively large surface areas of the colloidal oxides employed as well as their hydrophobicity resulting from chemisorption reaction thereof with organosilicon compounds. Thus, the presence of the colloidal oxide coating on the surface of the absorbent materials probably serves, even in extremely small concentrations, to vastly increase the effective surface area of the absorbent material.

What is claimed is:

1. An oil absorbent composition comprising a liquid-absorbing material bearing a coating thereover comprising at least about 0.1 weight percent thereof of a colloidal hydrophobic metal or metalloid oxide having a surface area of at least about 50 m.²/gram, an average ultimate particle diameter of less than about 0.5 micron and which oxide has chemically bound to the surface thereof at least about 0.5 weight percent of organosilicon surface structures conforming to the formula:

TABLE I

| | Sand absorbent | | | | Straw absorbent | | | |
| --- | --- | --- | --- | --- | --- | --- | --- | --- |
| | Wetting time (hours) | Oil uptake (grams oil/100 gms. absorbent) | | | Wetting time (hours) | Oil uptake (grams oil/100 gms. absorbent) | | |
| | | Dry | Prewetted (24 hours) | Retained efficiency (percent) | | Dry | Prewetted (24 hours) | Retained efficiency (percent) |
| Control | 0 | 25.4 | 0 | 0 | 3 | 463 | 0 | 0 |
| Treatment: | | | | | | | | |
| 1 | 0 | 23.9 | 4.8 | 20 | 5 | 261 | 170 | 65 |
| 2 | 0 | 24.8 | 0 | 0 | 30 | 396 | 269 | 68 |
| 3 | (¹) | 30.5 | 30.5 | 100 | (¹) | 378 | 316 | 84 |

¹ Test arrested after 48 hours, no wetting.

EXAMPLE 2

Two No. 2 cans, each equipped with inlet means at one end and outlet means at the other end and spun glass plugs in each of the inlet and outlet means are prepared as follows:

Into one can there is charged to capacity dry beach sand screened to $-12+20$ Tyler mesh. Into the other can there is charged similar beach sand which has been additionally treated by admixture with about 0.5% by weight thereof of a precipitated colloidal silica having an average particle diameter of about 20 millimicrons, a BET-$N_2$ surface area of about 80 m.²/gram, a porosity of about 10% and a surface hydroxyl group population of about wherein Si is silicon; each R is any alkyl, aryl, alkaryl, alkoxy, aryloxy, alkaryloxy or aralkoxy group; $a$ is an integer from 2 to 3; each X is a halogen or hydroxyl group, $b$ is an integer from 0 through 1; and $a+b=3$.

2. The oil absorbent composition of claim 1 wherein in the formula

$a$ is 3.

3. The oil absorbent composition of claim 1 wherein said liquid-absorbing material is dry vegetable matter.

4. The oil absorbent composition of claim 1 wherein said liquid-absorbing material is sand.

5. The oil absorbent composition of claim 1 wherein said liquid-absorbing material is particulate, granular or fibrous and has an average least dimension of greater than about 50 microns.

6. The oil absorbent composition of claim 1 wherein said organosilicon surface structures represent more than about 2% by weight of the hydrophobic metal or metalloid oxide.

7. The oil absorbent composition of claim 1 wherein said colloidal metal or metalloid oxide is pyrogenic or precipitated silica.

8. The oil absorbent composition of claim 1 wherein said colloidal metal or metalloid oxide has a porosity of less than about 10%.

9. The oil absorbent composition of claim 1 wherein said colloidal metal or metalloid oxide coating represents between about 0.25 percent by weight of the liquid-absorbing material.

10. A process for treating liquid-absorbing materials which comprises applying thereto at least about 0.1 percent by weight thereof of a colloidal hydrophobic metal or metalloid oxide having a BET-$N_2$ surface area of at least about 50 m.$^2$/gram, an average ultimate particle diameter of less than about 0.5 micron and which oxide bears chemically bound to the surface thereof at least 0.5 weight percent of surface structures conforming to the formula $$-SiR_aX_b$$

wherein Si is silicon; each R is any alkyl, aryl, alkaryl, alkoxy, aryloxy, alkaryloxy or aralkoxy group; $a$ is an integer from 2 to 3; each X is a halogen or hydroxyl group, $b$ is an integer from 0 through 1; and $a+b=3$.

11. The process of claim 10 wherein said coating is accomplished by mixing said liquid-absorbing material and said metal or metalloid oxide in the dry state.

12. The process of claim 10 wherein the amount of colloidal metal or metalloid oxide employed is sufficient to provide a colloidal oxide coating comprising between about 0.25 and about 2 percent by weight of said liquid-absorbing material.

13. A process for removing oil from water contaminated therewith which comprises contacting said water with an oil-absorbent composition comprising a liquid-absorbing material bearing a coating thereover comprising at least about 0.1 percent by weight thereof of a hydrophobic colloidal metal or metalloid oxide having a surface area of at least about 50 m.$^2$/gram, an average ultimate particle diameter of less than about 0.5 micron and which oxide has chemically bonded to the surface thereof at least about 0.5 weight percent thereof of organosilicon surface structure conforming to the formula:

$$-SiR_aX_b$$

wherein Si is silicon; each R is any alkyl, aryl, alkaryl, alkoxy, aryloxy, alkaryloxy or aralkoxy group; $a$ is an integer from 2 to 3; each X is a halogen or hydroxyl group, $b$ is an integer from 0 through 1; and $a+b=3$.

14. The process of claim 13 wherein said oil-absorbent composition is maintained in an enclosed zone and the water is conducted therethrough.

15. The process of claim 13 wherein said oil-absorbent composition is spread on the surface of an open body of water.

16. The process of claim 13 wherein said oil-absorbent composition is of sufficient density to sink beneath the water surface subsequent to contact of the oil therewith.

17. The process of claim 13 wherein said oil-absorbent composition is of sufficiently low density to float on the surface of a water body subsequent to contact of the oil therewith.

18. The process of claim 13 wherein said oil-absorbent composition is contacted with the water prior to contamination thereof with oil.

19. The process of claim 13 wherein said oil-absorbent composition comprises dry vegetable matter or sand bearing on the surface thereof a coating comprising between about 0.25 and about 2 percent by weight of a colloidal pyrogenic or precipitated silica of less than about 0.1 millimicron average ultimate particle diameter, said silica having at least about 2 percent by weight of said surface structures conforming to the formula $$-SiR_aX_b$$

chemically bound to the surface thereof.

References Cited

UNITED STATES PATENTS

| 2,705,222 | 3/1955 | Wagner | 117—100X |
| 3,382,170 | 5/1968 | Pape | 210—36 |
| 3,414,511 | 12/1968 | Hitzman | 210—40 |

SAMIH N. ZAHARNA, Primary Examiner

U.S. Cl. X.R.

117—100; 210—40, oil-water digest; 252—430